(12) United States Patent
Gruenewald et al.

(10) Patent No.: US 10,399,299 B2
(45) Date of Patent: *Sep. 3, 2019

(54) SANDWICH COMPONENT AND METHOD FOR PRODUCING A SANDWICH COMPONENT

(71) Applicant: Airbus Defence and Space GmbH, Ottobrunn (DE)

(72) Inventors: Jonas Gruenewald, Munich (DE); Patricia Parlevliet, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 420 days.

This patent is subject to a terminal disclaimer.

(21) Appl. No.: 14/719,568

(22) Filed: May 22, 2015

(65) Prior Publication Data

US 2015/0336352 A1 Nov. 26, 2015

(30) Foreign Application Priority Data

May 23, 2014 (DE) .................. 10 2014 007 510

(51) Int. Cl.
*B32B 7/00* (2006.01)
*B32B 7/12* (2006.01)
(Continued)

(52) U.S. Cl.
CPC .............. *B32B 7/12* (2013.01); *B29B 11/04* (2013.01); *B29B 11/14* (2013.01); *B29C 53/04* (2013.01);
(Continued)

(58) Field of Classification Search
None
See application file for complete search history.

(56) References Cited

U.S. PATENT DOCUMENTS 6,183,836 B1   2/2001 Pflug
6,726,974 B1 * 4/2004 Pflug .................. B29D 99/0089
                                                           264/280

(Continued)

FOREIGN PATENT DOCUMENTS

DE   41 18 286 A1   12/1992
DE   42 08 812 A1    9/1993
(Continued)

OTHER PUBLICATIONS

Arkema, "Lotader® 4700," Technical Data Sheet. (Year: 2014).*
(Continued)

*Primary Examiner* — Daniel J. Schleis
(74) *Attorney, Agent, or Firm* — Crowell & Moring LLP

(57) ABSTRACT

A sandwich component and method of producing the sandwich component are provided wherein the sandwich component has a first cover layer, a second cover layer, and a core disposed therebetween. In the sandwich component, the cover layers are each formed from an outer layer made of a fiber-reinforced high-melting-point thermoplast material and, fused therewith, an inner layer made of a low-melting-point thermoplast material. The core has outer layers, each of which is formed from a low-melting-point thermoplast material, and an inner structure, which is formed entirely or partially from a high-melting-point thermoplast material. The inner layers of the cover layers were each fused with one of the outer layers of the core.

4 Claims, 3 Drawing Sheets

(51) Int. Cl.
*B32B 37/14* (2006.01)
*B32B 37/18* (2006.01)
*B29B 11/04* (2006.01)
*B29B 11/14* (2006.01)
*B29C 53/04* (2006.01)
*B32B 38/00* (2006.01)
*B29C 65/00* (2006.01)
*B32B 27/28* (2006.01)
*B32B 5/00* (2006.01)
*B32B 5/02* (2006.01)
*B32B 5/10* (2006.01)
*B32B 7/04* (2019.01)
*B32B 19/02* (2006.01)
*B32B 19/04* (2006.01)
*B32B 25/00* (2006.01)
*B32B 25/02* (2006.01)
*B32B 25/04* (2006.01)
*B32B 25/16* (2006.01)
*B32B 27/00* (2006.01)
*B32B 27/06* (2006.01)
*B32B 27/08* (2006.01)
*B32B 27/12* (2006.01)
*B32B 27/18* (2006.01)
*B32B 27/30* (2006.01)
*B32B 27/32* (2006.01)
*B32B 27/36* (2006.01)
*B32B 3/00* (2006.01)
*B32B 3/12* (2006.01)
*B29K 671/00* (2006.01)
*B29K 679/00* (2006.01)
*B29K 71/00* (2006.01)
*B29K 79/00* (2006.01)

(52) U.S. Cl.
CPC ........ *B29C 66/006* (2013.01); *B29C 66/7254* (2013.01); *B32B 3/00* (2013.01); *B32B 3/12* (2013.01); *B32B 5/00* (2013.01); *B32B 5/02* (2013.01); *B32B 5/10* (2013.01); *B32B 7/00* (2013.01); *B32B 7/04* (2013.01); *B32B 19/02* (2013.01); *B32B 19/04* (2013.01); *B32B 19/048* (2013.01); *B32B 25/00* (2013.01); *B32B 25/02* (2013.01); *B32B 25/04* (2013.01); *B32B 25/16* (2013.01); *B32B 27/00* (2013.01); *B32B 27/06* (2013.01); *B32B 27/08* (2013.01); *B32B 27/12* (2013.01); *B32B 27/18* (2013.01); *B32B 27/28* (2013.01); *B32B 27/281* (2013.01); *B32B 27/285* (2013.01); *B32B 27/288* (2013.01); *B32B 27/30* (2013.01); *B32B 27/302* (2013.01); *B32B 27/32* (2013.01); *B32B 27/36* (2013.01); *B32B 37/144* (2013.01); *B32B 37/18* (2013.01); *B32B 38/0012* (2013.01); *B29K 2071/00* (2013.01); *B29K 2079/085* (2013.01); *B29K 2671/00* (2013.01); *B29K 2679/085* (2013.01); *B32B 2250/05* (2013.01); *B32B 2250/24* (2013.01); *B32B 2250/40* (2013.01); *B32B 2262/00* (2013.01); *B32B 2274/00* (2013.01); *B32B 2305/024* (2013.01); *B32B 2305/08* (2013.01); *B32B 2307/30* (2013.01); *B32B 2307/50* (2013.01); *B32B 2307/738* (2013.01); *B32B 2371/00* (2013.01); *B32B 2379/08* (2013.01); *B32B 2605/00* (2013.01); *B32B 2605/18* (2013.01); *Y10T 156/1051* (2015.01); *Y10T 428/24149* (2015.01); *Y10T 428/31721* (2015.04)

(56) References Cited

U.S. PATENT DOCUMENTS

| 7,851,042 | B2* | 12/2010 | Dehennau | B29C 47/0028 264/294 |
| 2013/0236688 | A1* | 9/2013 | Stamp | B29C 70/086 428/116 |

FOREIGN PATENT DOCUMENTS

| DE | 196 04 611 A1 | 8/1997 |
| DE | 10 2006 056 353 B3 | 12/2007 |
| DE | 10 2008 028 864 B4 | 4/2013 |
| DE | 10 2012 023 753 A1 | 6/2014 |
| EP | 2 439 068 A1 | 4/2012 |
| WO | WO 97/03816 A1 | 2/1997 |
| WO | WO 00/32382 A1 | 6/2000 |
| WO | WO 2006/106101 A1 | 10/2006 |

OTHER PUBLICATIONS

"Sylvin Technologies 916V0-95 Natural PVC for Injection Molding," Material Properties, no date.*
German Office Action dated Jan. 20, 2015 (six (6) pages).
European Search Report issued in counterpart European Application No. 15001510.5-1303 dated Aug. 6, 2015, with Statement of Relevancy (Seven (7) pages).

* cited by examiner

SANDWICH COMPONENT AND METHOD FOR PRODUCING A SANDWICH COMPONENT

CROSS REFERENCE TO RELATED APPLICATIONS

This application claims priority under 35 U.S.C. § 119 from German Patent Application No. 10 2014 007 510.9, filed May 23, 2014, the entire disclosure of which is herein expressly incorporated by reference.

This application contains subject matter related to U.S. application Ser. No. 14/719,774, entitled "Sandwich Component and Method for Producing a Sandwich Component" filed on even date herewith.

BACKGROUND AND SUMMARY OF THE INVENTION

The present invention relates to a sandwich component, i.e., a component in which materials having various properties are assembled in layers, wherein these material layers comprise at least two cover layers and a core disposed therebetween. The invention further relates to a method for producing a sandwich component.

Known sandwich components usually comprise a relatively thick, but lightweight, core, which is disposed between two relatively thinner, but mechanically more stable, cover layers and is connected (e.g., bonded) to these cover layers.

Such components produced in a sandwich design can be used particularly advantageously in lightweight construction, e.g., as components for aircraft construction.

In the case of known sandwich components, the core is often made of a foamed material, or, e.g., of a so-called honeycomb structure (e.g., made of paper, cardboard, plastic, or metal). In the prior art, sheet metal, wood or plywood, or fiber composite materials, for example, are used, inter alia, as cover layers.

A basic problem with the production of a sandwich component in terms of the stability of the finished component is that of achieving a best possible (mechanically loadable) connection of the cover layers at the core.

One possibility therefor is an "adhesive connection", i.e., connecting the core to the cover layers by use of an adhesive or a hot melt adhesive layer.

Depending on the properties of the materials to be bonded together, this method, however, often results in the disadvantage of inadequate strength of the adhesive connection.

In order to prevent this disadvantage, one possibility is to connect the cover layers to the core by use of a "cohesive connection", i.e., by means of a hot melt connection between the core layers and the cover layers, without the use of an additional material. To this end, the materials that are adjacent to one another are softened or melted, are joined under pressure, and are re-hardened.

Apart from the fact that this cohesive connection presupposes the selection of materials that can be softened or melted and, in addition, are appropriately compatible (i.e., can be fused with one another), this method often results, in practical application, in the serious disadvantage (or a reason to not use this method) that the cover layers and/or the core are damaged by the softening or melting of the materials and the joining under pressure.

This problem is particularly serious, for example, when the intention is to use a honeycomb structure formed from a thermoplast material as the core. An application of temperature and pressure on such a honeycomb structure, which is carried out in order to create a cohesive connection, usually results in an unwanted and disadvantageous deformation or a "collapse" of the honeycomb structure.

A problem addressed by the present invention is that of providing a sandwich component and a method for the production of a sandwich component, in which the aforementioned problems are avoided.

This problem is solved according to the invention by a sandwich component, and method of producing same, wherein the sandwich component comprises a first cover layer, a second cover layer, and a core disposed therebetween. Therein the cover layers are each formed from an outer layer made of a fiber-reinforced, high-melting-point thermoplast material and, fused therewith, an inner layer made of a low-melting-point thermoplast material. The core has outer layers, each of which is formed from a low-melting point thermoplast material, and an inner structure, which is formed entirely or partially from a high-melting-point thermoplast material. The inner layers of the cover layers are each fused with one of the outer layers of the core.

In the method according to the invention for producing such a sandwich component, initially the first cover layer, the second cover layer, and the core are provided (prefabricated), and then the core is arranged between the cover layers and, finally, the inner layers of the cover layers are each fused with one of the outer layers of the core.

In this context, the term "fused" means that the relevant thermoplast materials were brought to at least the softening temperature (in the case of various thermoplast materials, this is the greater of the two softening temperatures), at least on the surfaces thereof, and were joined to one another in this state, wherein, in this fusion procedure, a more or less great diffusion of the materials of the joining partners into one another and, therefore, a "cohesive connection" takes place.

The expressions "high-melting-point" and "low-melting point" are intended to be understood relative to one another, specifically in the sense that a high-melting-point thermoplast material has a higher softening temperature than a low-melting-point thermoplast material.

In this context, the term "softening temperature" refers to a temperature at which the relevant material softens or melts such that a cohesive connection can be created by means of joining another material thereto, which has also been softened or melted. For the definition of this "softening temperature" within the scope of the invention, it is possible to use values that are found, e.g., in previously published tables and reference works, in particular, which present the particular "glass transition temperature" (for amorphous thermoplast materials), "melting temperature" (for partially crystalline thermoplast materials) and "melting temperature" (for crystalline thermoplast materials).

The "softening temperature" of thermoplast materials can be determined via experimentation, e.g., in particular by use of common methods such as thermomechanical analysis (TMA), dynamic mechanical analysis (DMA), or dynamic differential calorimetry (DSC).

Within the scope of the invention, it is in no way ruled out that a plurality of different "high-melting point thermoplast materials" and/or a plurality of various "low-melting-point thermoplast materials" are present in the sandwich component or are processed in the production process. In this case, the specifications "high-melting-point" and "low-melting point" are also intended to be understood relative to one another, specifically in the sense that all softening temperatures of high-melting-point materials are greater than every one of the softening temperatures of low-melting-point materials.

In other words, the expressions "high-melting-point" and "low-melting-point" refer to the situation in which a (not necessarily unambiguously defined) "joining temperature" can be indicated such that one or every "high-melting-point" thermoplast material has a softening temperature that is greater than the joining temperature, whereas one or every low-melting-point thermoplast material has a softening temperature that is lower than the joining temperature.

As explained above, a unique feature of the sandwich component according to embodiments of the invention is that the cover layers are each formed from an outer layer made of a fiber-reinforced high-melting-point thermoplast material and, fused therewith, an inner layer made of a low-melting-point thermoplast material. Each of the cover layers therefore has two layers, which, however, are fused with one another and, therefore, advantageously, are cohesively connected to one another. In addition, a cohesive connection is also advantageously provided between the cover layers and the core in that the respective outer layers of the core formed from a low-melting-point thermoplast material are likewise fused with the respective inner layers of the cover layers, which are formed from a low-melting-point thermoplast material.

The sandwich component according to embodiments of the invention therefore has all the advantages of the initially explained "cohesive connection" of the cover layers at the core, but thereby avoids the risk of incurring notable damage to the cover layers and/or to the core within the scope of producing the sandwich component, because, in order to join the cover layers and the core to create the cohesive connection, it is sufficient to heat the cover layers and the core only to the extent that the low-melting-point thermoplast materials thereof soften, but the high-melting-point thermoplast materials do not.

In other words, the cover layers and the core can be joined, advantageously, at a temperature at which neither the outer layers of the cover layers nor the inner structure of the core softens.

In one embodiment, the low-melting-point thermoplast materials are identical to an inner layer of a cover layer and to the outer layer of the core fused therewith.

In a development of this embodiment, all the low-melting-point thermoplast materials, i.e., those of the inner layers of the two cover layers and those of the outer layers of the core, are identical.

If the low-melting-point thermoplast materials of an inner layer of a cover layer and the outer layer of the core fused therewith are not selected to be identical, which is less preferred, however, then it is only necessary to ensure the compatibility thereof in the sense of a fusibility (miscibility) of the two materials.

In a preferred embodiment, the difference between the softening temperature of the high-melting-point thermoplast material (or, if various such materials are present, the minimum softening temperature of these materials) and the softening temperature of the low-melting-point thermoplast material (or, if various such materials are present, the maximum softening temperature of these materials) is greater than 5° C., preferably greater than 50° C., in particular greater than 100° C.

In one embodiment, at least one of the thermoplast materials is selected from the group comprising ABS (acrylonitrile butadiene styrene), PA (polyamide), PBT (polybutylene terephthalate), PC (polycarbonate), PEEK (polyetheretherketone), PEI (polyetherimide), PES (polyethersulfone), PET (polyethylene terephthalate), PP (polypropylene), PPS (polyphenylene sulfide), PPSU (polyphenylsulfone), and PSU (polysulfone).

In an embodiment suited, in particular, for applications of the sandwich component in the aviation and aerospace industries, at least one of the thermoplast materials is selected from the group comprising, e.g., PEEK, PEI, PES, PPS, PPSU, PSU.

With respect to other applications as well, in particular, it is possible, e.g., that at least one of the thermoplast materials is selected from the group comprising ABS, PA, PBT, PC, PP.

Some of the thermoplast materials mentioned above as examples are amorphous materials and some are partially crystalline materials. A value that is known from the literature can be used as the "softening temperature" in each case, for example, the glass transition temperature "TG" for amorphous thermoplast materials and the melting temperature "TM" for partially crystalline thermoplast materials.

The literature contains the following values, for example, for the aforementioned materials: ABS (amorphous, TG=95° C.-105° C.), PA11 (partially crystalline, TG=40-55° C., TM=180-190° C.), PA12 (partially crystalline, TG=40-50° C., TM=170° C.-180° C.), PA6 (partially crystalline, TG=45-80° C., TM=225° C.-235° C.), PBT (partially crystalline, TG=40-60° C., TM=220° C.-230° C.), PC (amorphous, TG=140° C.-150° C.), PEEK (partially crystalline, TG=145° C.-155° C., TM=335° C.-345° C.), PEI (amorphous, TG=215° C.-230° C.), PES (amorphous TG=220° C.-230° C.), PET (partially crystalline, TG=70° C.-85° C., TM=245° C.-260° C.), PP (partially crystalline, TG=−20° C.-20° C., TM=160° C.-165° C.), PPS (partially crystalline, TG=85° C.-100° C., TM=275° C.-290° C.), PPSU (amorphous, TG=ca. 220° C.), PSU (amorphous, TG=185° C.-90° C.).

In one embodiment, the high-melting-point thermoplast material is PEEK (softening temperature approximately 340° C.), for at least one (or both) outer layers of the cover layers and/or the inner structure of the core.

In one embodiment, the low-melting-point thermoplast material is PEI (softening temperature approximately 220° C.), for at least one (or both) inner layers of the cover layers and/or at least one (or both) outer layers of the core.

In one embodiment, the outer layer of at least one of the cover layers is reinforced with carbon fibers. Instead of carbon fibers, other reinforcing fibers can also be provided, however, e.g., glass fibers. At least it is expedient to reinforce the outer layers of the cover layers with fibers of the same type, i.e., both outer layers, e.g., with carbon fibers or with glass fibers. It should not be ruled out, however, to reinforce the outer layers of the two cover layers with different types of fiber material.

The fibrous material, which is enclosed in the outer layers of the cover layers by the high-melting-point thermoplast material as "matrix material", can be provided in each case, e.g., in the form of one or more layers of a fabric, a non-woven material, or a mesh. As an alternative or in addition, it is possible to provide "short fibers" that are matted in the matrix material.

The same type of matrix material can be selected for both cover layers. It should not be ruled out, however, to provide different high-melting-point thermoplast materials for the outer layers of the two cover layers.

In one embodiment, PEEK is used as the matrix material for the outer layer of at least one, in particular both cover layers.

In one embodiment, PEI is used as the material for the inner layer of at least one, in particular both cover layers.

In one embodiment, in the case of at least one, in particular both cover layers, the thickness of the cover layer is at least 0.2 mm, in particular at least 0.4 mm.

In one embodiment, in the case of at least one, in particular both cover layers, the thickness of the cover layer is at most 6 mm, in particular at most 3 mm.

In one embodiment, in the case of at least one, in particular both cover layers, the thickness of the inner layer is at least 0.01-fold, in particular at least 0.1-fold the total thickness of the relevant cover layer.

In one embodiment, in the case of at least one, in particular both cover layers, the thickness of the inner layer is at most 0.5-fold, in particular at most 0.3-fold the total thickness of the relevant cover layer.

In one embodiment, the core of a foamed material layer (inner structure) is formed from a high-melting-point thermoplast material having outer layers fused therewith, on both sides, each of which is formed from a low-melting-point thermoplast material.

In another embodiment, the core is a so-called honeycomb core. Sandwich components having a honeycomb core are known from the prior art, e.g., having a honeycomb core made of cardboard, resin-impregnated paper, fibrous plastic, or thin aluminum foils.

In the case of the sandwich component according to embodiments of the invention, if the core is designed as a honeycomb core, this must comprise outer layers, which are formed from a low-melting-point thermoplast material, and a honeycomb-shaped inner structure, which at least partially comprises a high-melting-point thermoplast material.

One possibility therefor would be, for example, a honeycomb structure formed from the high-melting-point thermoplast material (e.g., PEEK), which is fixedly connected, in particular being fused, on both sides, to outer layers (outermost layers of "honeycomb structure cover layers"), each of which is made from a low-melting-point thermoplast material (e.g., PEI).

In one embodiment, the two outer layers of the core are made of an identical low-melting-point thermoplast material.

According to a preferred development of the embodiment having a honeycomb core, said honeycomb core is designed as a so-called folded honeycomb or a folded honeycomb structure.

A folded honeycomb structure is characterized in that this was formed starting from a flat body made of a plastically deformable material (e.g., thermoplastic plastic film), in that this body was plastically deformed (including having been "folded") such that this honeycomb structure results. Optionally, cuts can also be introduced into the flat material before the deformation and folding process is carried out.

With respect to the specific design of such a folded honeycomb structure or the production thereof, reference can be made, advantageously, within the framework of the invention, to the related prior art, for example. Patent documents WO 97/03816, WO 00/32382, DE 10 2006 056 353 B3 and DE 10 2008 028 864 B4 are mentioned merely as examples thereof.

The term "folded honeycomb structure" used here is intended to refer to structures having cell and honeycomb walls extending vertically (in the "sandwich direction") as well as structures having diagonally extending walls. In contrast, in the prior art (cf., e.g., DE 10 2006 056 353 B3 and DE 10 2008 028 864 B4), the initially mentioned structures are often also referred to as "honeycomb" structures, each of which has honeycombs having a hexagonal cross-section, and the second structures that are mentioned are referred to as folded honeycombs.

In one embodiment, the thickness of the core is at least 3 mm, in particular at least 6 mm or at least 10 mm.

In one embodiment, the thickness of the core is at most 50 mm, in particular at most 25 mm. With respect to the application of a use of the sandwich component (also) for thermal insulation, it is also contemplated, however, to provide the core (in particular, e.g., having an inner structure made of foamed material) with a thickness of more than 25 mm, e.g., up to a thickness of 100 mm or even 200 mm.

In one embodiment, it is provided for at least one, in particular both outer layers of the core that the thickness of the outer layer, which is formed from low-melting-point thermoplast material, is at least 0.0001-fold, in particular at least 0.01-fold the total thickness of the core.

In one embodiment, it is provided for at least one, in particular both outer layers of the core that the thickness of the outer layer, which is formed from low-melting-point thermoplast material, is at most 0.1-fold, in particular at most 0.05-fold the total thickness of the core.

A unique feature of the method according to embodiments of the invention for producing a sandwich component of the type described herein is to fuse the cover layers, which are specially designed as described herein, with the core, which is specially designed as described herein.

In order to provide the cover layers, it is advantageously possible in each case to fuse, e.g., a prefabricated outer layer (flat fiber composite material) with a prefabricated inner layer (e.g., assembled thermoplastic film material) by using pressure and temperature, e.g., in a shaping tool or, e.g., in a continuous laminating process. A temperature of at least the softening temperature of the high-melting-point thermoplast material of the outer layer must be used for this fusion. As an alternative, it is possible to "apply" the inner layer "by lamination" already during the production of the fiber composite material (outer layer).

In order to provide the core, e.g., in a similar fusion process, a prefabricated foamed material layer made of a high-melting-point thermoplast material can be provided, on both sides, with outer layers of a low-melting-point thermoplast material.

In a preferred embodiment, however, in order to provide the core, a film of a high-melting-point thermoplast material coated on both sides with a low-melting-point thermoplast material is reshaped in order to form a folded honeycomb structure.

Such a method for producing a folded honeycomb structure, apart from the film of a high-melting-point thermoplast material which, according to the invention, is coated with a low-melting-point thermoplast material for this purpose, can be advantageously made available according to methods known per se. An example thereof is the method described in WO 00/32382, which comprises the following steps of:
  providing a flat body made of a plastically deformable material,
  reshaping the flat body in strip-shaped regions to be polygonal, sinusoidal, or circular, wherein the strip-shaped regions located between these regions are formed entirely or not at all, in alternation, out of the plane of the flat starting body, and
  folding the polygonally, sinusoidally or circularly plastically deformed regions by approximately 90° relative to the strip-shaped regions.

The resultant folded honeycomb structure is then formed from a plurality of cells (honeycombs) arranged in rows, wherein the cells have lateral cell walls, which annularly adjoin one another and are delimited toward the opening sides of the cell by honeycomb cover layer levels, wherein the cells can be completely bridged in both honeycomb cover layer levels, in particular. The cell walls can be permanently connected to one another, entirely or partially, in this manner.

When a film composed of various thermoplast materials in layers, e.g., having an inner layer made of a high-melting-point thermoplast material and, fused therewith on both sides thereof, outer layers each made of a low-melting-point thermoplast material, is used as a flat starting body in this method, which is known per se, for producing a honeycomb structure within the scope of the invention, the result is a folded honeycomb core, which can be used in the invention, comprising outer layers (outermost layer of the honeycomb structure cover layers) made of the relevant, low-melting-point thermoplast material and an inner structure, which is formed partially from high-melting-point thermoplast material and partially from low-melting-point thermoplast material.

In the final step of the method for producing a sandwich component, the inner layers of the cover layers are each fused with one of the outer layers of the core.

In this fusion with the application of pressure and temperature, a temperature is preferably used, which corresponds to the softening temperature of the low-melting point thermoplast material or, in the non-excluded case of various low-melting-point thermoplast materials, a temperature, which corresponds to the maximum of the softening temperatures of these low-melting-point thermoplast materials.

The temperature that is used ("joining temperature") can also be higher (e.g., by at least 10° C., in particular at least 20° C., than the (maximum) softening temperature of the particular joining partner materials). In this case, however, this temperature is preferably lower (e.g., by at least 10° C., in particular at least 20° C.) than the softening temperature of the high-melting-point thermoplast material, or, in the case of different high-melting-point thermoplast materials, is lower (e.g., by at least 10° C., in particular at least 20° C.) than the minimum softening temperature of these high-melting-point materials.

According to an advantageous development of the provision of the core as a folded honeycomb structure by reshaping a film of a high-melting-point thermoplast material coated with a low-melting-point thermoplast material, this coating is carried out only in regions, according to the specific shaping process, such that the low-melting-point thermoplast material is present on the finished folded honeycomb structure only in the region of the folded honeycomb structure cover layers, but not in the region of the inner structure of the folded honeycomb structure. This development eliminates the risk that, in the final production step for the sandwich component, the other low-melting-point thermoplast portions that are present in the inner structure are softened.

Other objects, advantages and novel features of the present invention will become apparent from the following detailed description of one or more preferred embodiments when considered in conjunction with the accompanying drawings.

DETAILED DESCRIPTION OF THE INVENTION

FIGS. 1 to 7 depict the production of a sandwich component according to one exemplary embodiment.

Figure 6:
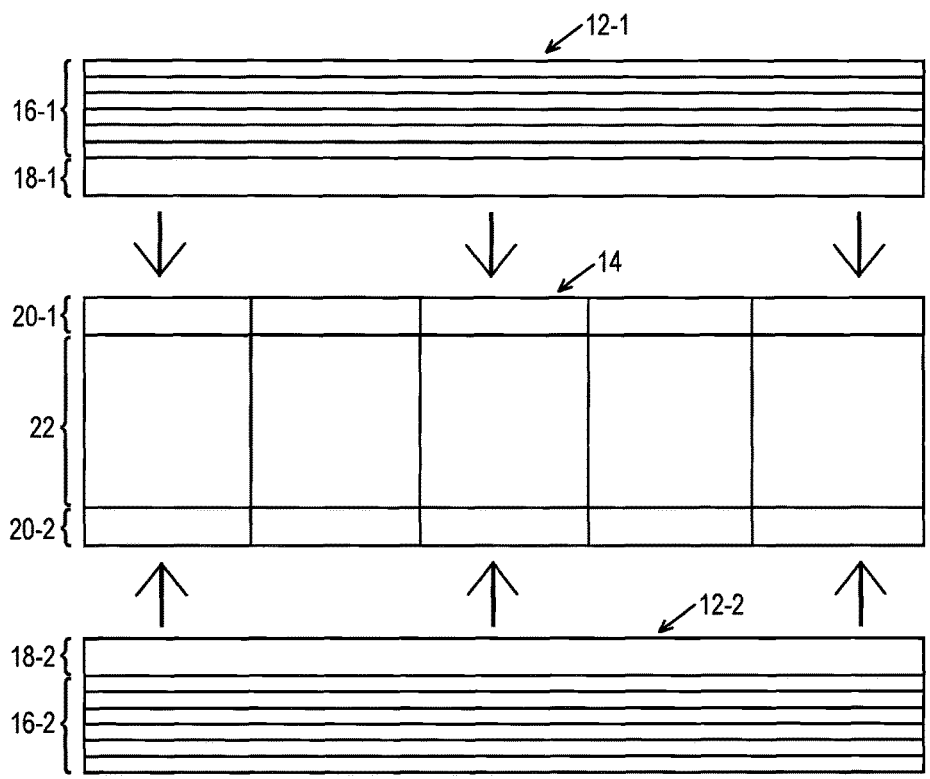
FIG. 6 shows a fabrication of the sandwich component by fusing two cover layers of the type depicted in FIG. 2 having a core prefabricated according to the method depicted in FIG. 5.
Figure 7:
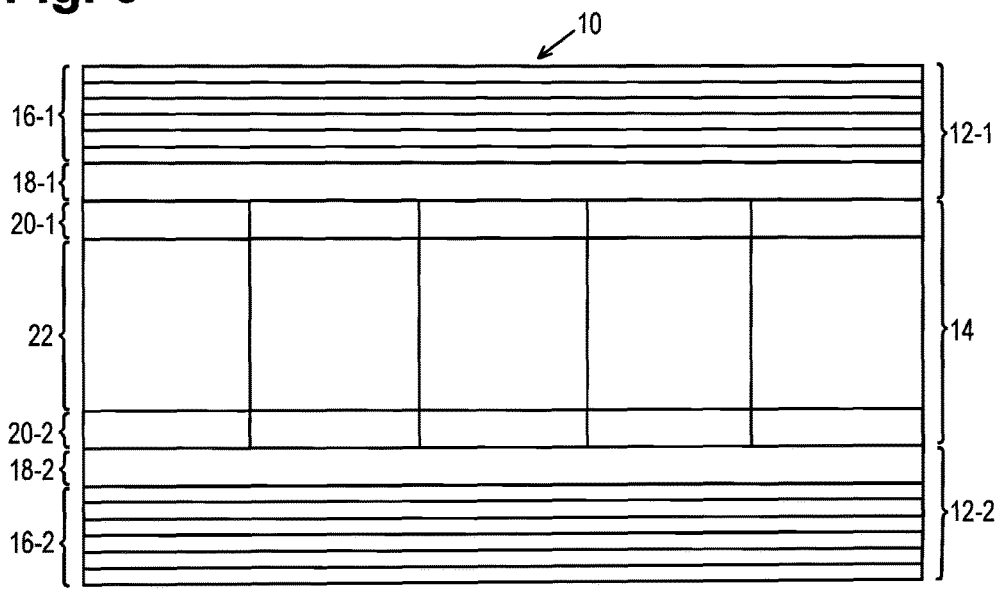
FIG. 7 shows the finished sandwich component.

The configuration of the finished sandwich component 10 will be addressed first, with reference to FIG. 7. Next, the method used to produce the sandwich component 10 will be described with reference to FIGS. 1 to 6.

FIG. 7 shows the finished sandwich component 10, comprising a first cover layer 12-1, a second cover layer 12-2, and a core 14 disposed therebetween.

The cover layers 12-1 and 12-2 are each formed from an outer layer 16-1 made of a fiber-reinforced "high-melting-point thermoplast material" and, fused therewith, an inner layer 18-1 made of a "low-melting-point thermoplast material".

In the example shown, the outer layer 16-1 is a fiber composite material, in the case of which a single- or multiple-layer carbon fiber material is embedded in a matrix of PEEK. In this example, PEEK is therefore the high-melting-point thermoplast material of the cover layer 12-1.

In contrast, the inner layer 18-1 in the example shown is made of PEI, which, in this example, is therefore the low-melting-point thermoplast material of the cover layer 12-1.

The core 14 comprises outer layers 20-1 and 20-2 facing the cover layers 12-1, 12-2, respectively, each of which is formed from a low-melting-point thermoplast material, specifically PEI in this case, and comprises a honeycomb-type inner structure 22, which is formed partially from high-melting-point thermoplast material, specifically PEEK in this case, and partially from low-melting-point thermoplast material, specifically PEI in this case.

The inner layers 18-1, 18-2 of the cover layers 12-1, 12-2 are fused with one of the outer layers 20-1, 20-2, respectively, of the core 14.

The sandwich component 10 can be used particularly advantageously, e.g., as a component, in particular as a horizontally extended component (fuselage section, panel, etc.) in vehicle or aircraft construction.

FIGS. 1 to 6 show individual steps or stages in the production of the sandwich component 10 depicted in FIG. 7.

In a first step, the cover layers 12-1, 12-2 and the core 14 are prefabricated.

Figure 1:
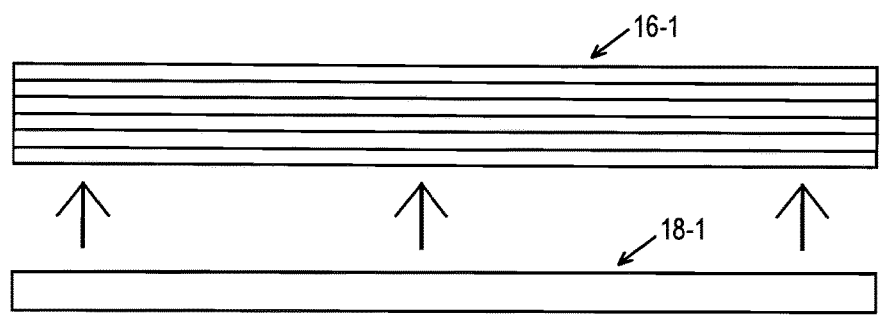
FIG. 1 shows a prefabrication of a cover layer for a sandwich component.
Figure 2:
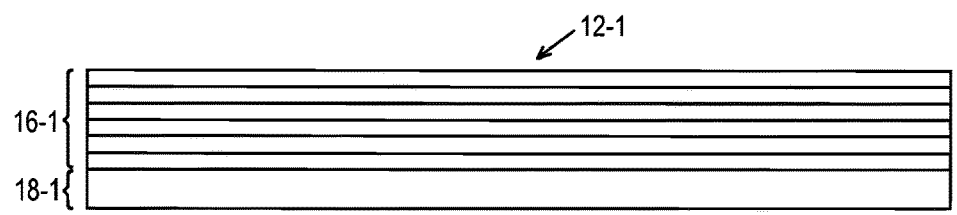
FIG. 2 shows the prefabricated cover layer.

The prefabrication of the cover layers 12-1 and 12-2 is carried out—as illustrated in FIG. 1 for the cover layer 12-1 as an example—by a mutual fusion (cohesive connection) of the outer layer 16-1, which was previously produced using composite fiber technology, with the inner layer 18-1, which was previously produced, e.g., by extrusion. The resultant product, i.e., the cover layer 12-1, is depicted in FIG. 2. The prefabrication of the second cover layer 12-2 takes place in a similar manner.

In deviation from the method illustrated in FIGS. 1 and 2, it is possible to "apply" the inner layer "by lamination" already during the prefabrication of the outer layer, i.e., to embed the fibrous material in the outer layer and connect the inner layer in one step, e.g., in a shaping tool.

Figure 3:
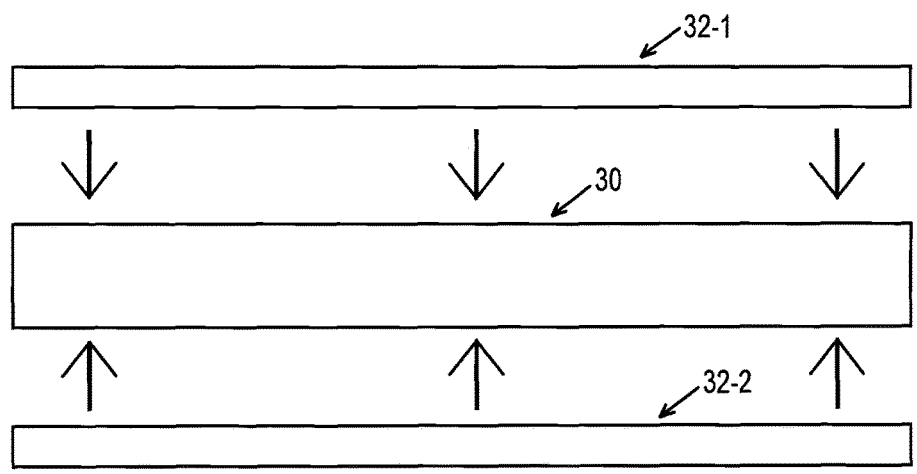
FIG. 3 shows a prefabrication of a thermoplast film for use as the starting material for producing a folded honeycomb structure.
Figure 4:
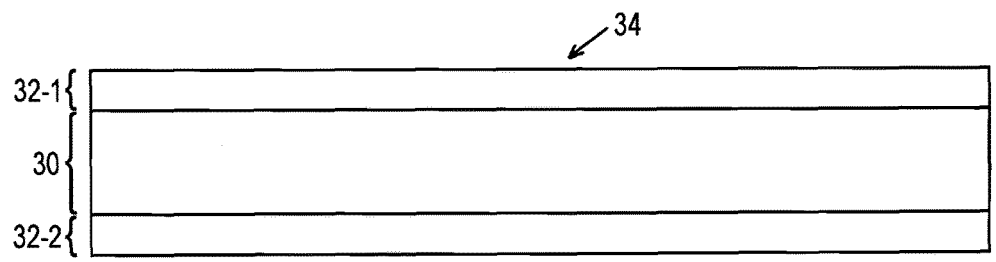
FIG. 4 shows the prefabricated thermoplast film.
Figure 5:
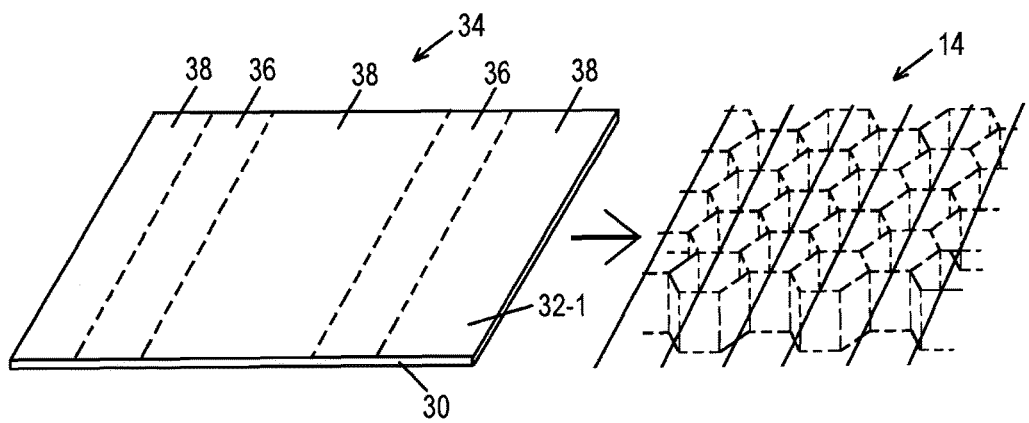
FIG. 5 shows a prefabrication of the folded honeycomb structure made of the thermoplast film depicted in FIG. 4.

The prefabrication of the core 14 is illustrated in FIGS. 3 to 5.

First, as shown in FIG. 3, a prefabricated film 30 made of high-melting-point thermoplast material is coated on both sides with films 32-1 and 32-2 of a low-melting-point thermoplast material. Preferably, the film 30 and the films 32-1, 32-2 are cohesively connected to one another, i.e., are fused.

The resultant product is a compound film 34, which is shown in FIG. 4.

Next, as symbolized in FIG. 5, a folded honeycomb structure, which is the core 14 (FIG. 5, right) is created by means of a reshaping process with the compound film 34 as the starting material (FIG. 5, left).

In the example shown, the core 14 is therefore formed as a so-called folded honeycomb or a folded honeycomb structure. With respect to the reshaping process used therefor, reference can be advantageously made to the related prior art.

In the example shown, a reshaping process was selected, by which, in particular, upper and lower "honeycomb structure cover layers" were also formed from the correspondingly shaped (and folded) starting material 34.

Since these honeycomb structure cover layers (as well as the inner structure) are formed from the compound film 34 and, in this compound film 34, both surfaces of the films 32-1, 32-2 are formed from a low-melting-point thermoplast material, it is ensured that the core 14 resulting from the reshaping process has outer layers 20-1, 20-2 made of low-melting-point thermoplast material.

The latter is significant for the final step in the production of the sandwich component, which is illustrated in FIG. 6. In this step, the prefabricated core 14 is disposed between the two cover layers 12-1, 12-2, as shown, and the inner layers 18-1, 18-2 of the cover layers 12-1, 12-2 are each fused with one of the outer layers 20-1, 20-2, respectively, with the application of pressure and temperature. The result is the finished sandwich component 10 depicted in FIG. 7.

In the above-described exemplary embodiment, the film 30 made of high-temperature thermoplast material was completely coated on both sides with the films 32-1 and 32-2.

As a result, the inner structure of the core 14 is formed partially of high-melting-point thermoplast material (film 30) and partially of low-melting-point thermoplast material (film 32-1, 32-2).

In the final production step for the sandwich component, care must be taken to ensure that largely no unwanted softening of the low-melting-point thermoplast portions present in the inner structure 22 of the core 14 occurs.

With respect to this aspect, according to an advantageous development of the provision of the folded honeycomb structure by reshaping a film made of a high-melting-point thermoplast material coated with a low-melting-point thermoplast material, this coating is carried out only in regions, according to the specific reshaping process, such that the low-melting-point thermoplast material is present on the finished folded honeycomb structure only in the region of the folded honeycomb structure cover layers.

Therefore, e.g., the above-described exemplary embodiment could be advantageously modified such that the coating on both sides of the film 30, as illustrated in FIGS. 4 and 5, is not carried out over the entire surface, but rather only in strip-shaped regions 36 as indicated by dashed lines in FIG. 5, said strip-shaped regions alternating with non-coated regions 38 in the processing direction of the compound film 34, wherein the width of the strips 36 and 38 relative to the processing direction is selected such that, as a result of the reshaping process, the inner structure 22 of the core 14 is formed only from the non-coated regions 38, i.e., high-melting-point thermoplast material, whereas the cover layers 20-1 and 20-2 of the core 14 are formed from the coated regions 36, in the compound with the film 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sandwich component, comprising:
   a first cover layer, a second cover layer, and a core disposed therebetween, wherein
   the first and second cover layers are each formed from an outer layer made of a fiber-reinforced high-melting-point thermoplast material and, fused therewith, an inner layer made of a low-melting-point thermoplast material,
   the core has outer layers each of which is formed from a low-melting-point thermoplast material, and an inner structure, which is formed entirely or partially from a high-melting-point thermoplast material,
   the inner layers of the cover layers are each fused with one of the outer layers of the core, and
   the core is a honeycomb core, which is a folded honeycomb structure, which is provided by reshaping a film of high-melting-point thermoplast material coated with a low-melting-point thermoplast material, this coating being carried out only in regions, according to the specific shaping process, such that the low-melting-point thermoplast material is present on the finished folded honeycomb structure only in the region of the folded honeycomb structure cover layers, but not in the region of the inner structure of the folded honeycomb structure.

2. The sandwich component according to claim 1, wherein the low-melting-point thermoplast materials are identical for an inner layer of a cover layer and the outer layer of the core fused therewith.

3. The sandwich component according to claim 2, wherein at least one of the thermoplast materials is selected from the group comprising: ABS, PA, PBT, PC, PEEK, PEI, PES, PET, PP, PPS, PPSU, PSU.

4. The sandwich component according to claim 1, wherein at least one of the thermoplast materials is selected from the group comprising: ABS, PA, PBT, PC, PEEK, PEI, PES, PET, PP, PPS, PPSU, PSU.

* * * * *